United States Patent [19]

Goracke

[11] 3,953,217

[45] Apr. 27, 1976

[54] LIQUID POLISH

[76] Inventor: John Goracke, P.O. Box 103, Yuma, Ariz. 85364

[22] Filed: Dec. 9, 1974

[21] Appl. No.: 530,752

[52] U.S. Cl. .................................. 106/8; 106/9; 106/11; 106/251; 106/261; 106/266; 106/267; 106/285
[51] Int. Cl.$^2$ ...................... C09G 1/02; C09G 1/06
[58] Field of Search ............. 106/8, 9, 11, 243, 244, 106/251, 253, 260, 267, 285

[56] References Cited

UNITED STATES PATENTS

| | | | |
|---|---|---|---|
| 879,375 | 2/1908 | Ellis | 106/8 |
| 907,758 | 12/1908 | Ellis | 106/9 |

*Primary Examiner*—Joan E. Welcome
*Attorney, Agent, or Firm*—Lowe, Kokjer, Kircher, Wharton & Bowman

[57] ABSTRACT

A clear liquid polish composition of isoamyl acetate, calcium oxide, tung oil, sodium bicarbonate, boric acid, and turpentine.

2 Claims, No Drawings

LIQUID POLISH

BACKGROUND AND SUMMARY OF THE INVENTION

This invention relates to an all purpose cleaning and polishing composition.

In this field, it is known that compositions of turpentine, naphtha, and selected oils possess cleaning and polishing capabilities. However, there is a need for a liquid polish which is easy to apply and which also imparts a high gloss to the application surface. The primary object of this invention is to provide such a polish composition.

More particularly, an object of the invention is to provide a liquid polish for painted surfaces to impart thereto a high lustre, protective coating with a minimum amount of effort. Application requires only a small quantity of polish spread on the surface to be protected. After the composition dries, a gentle rubbing action with a soft cloth establishes a high gloss sheen to the surface.

Another object of the invention is to provide a clear liquid polish which has great penetrating power in order to renew and brighten old painted surfaces without leaving a waxy residue.

An additional object of the invention is to provide a polish for imitation or genuine leather goods which leaves the material soft and pliable while imparting a glossy finish thereto.

A further object of the invention is to provide a composition for an inexpensive cleaning and polishing agent that can be safely applied to a wide variety of surfaces including metallic, such as automobiles, and wooden, such as fine quality furniture, to amplify the lustrous finish of such articles.

Other and further objects of the invention, together with the features of novely appurtenant thereto, will appear in the course of the following description.

DESCRIPTION OF THE INVENTION

I have discovered that a liquid polish composition of isoamyl acetate (commonly known as banana oil), calcium oxide (commonly known as dehydrated lime), tung oil, sodium bicarbonate (commonly known as baking soda), boric acid, and turpentine (also known as oil of turpentine) is useful as a cleaning and polishing agent possessing superior qualities with respect to ease of application and high gloss sheen.

The amounts of the components may be greatly varied. Generally speaking, a composition of 1 to 16% isoamyl acetate, ¼ to 4% calcium oxide, ¼ to 6% tung oil, ¼ to 8% sodium bicarbonate, ¼ to 8% boric acid, and the balance of turpentine (approximately 58 to 98%) achieves the desired properties, all amounts being given as volume percentage. However, a preferred polish composition can be formulated by 3 to 8% isoamyl acetate, ¼ to 1% calcium oxide, ¼ to 2% tung oil, ¼ to 4% sodium bicarbonate, ¼ to 4% boric acid, and the balance of turpentine.

The ingredients calcium oxide, sodium bicarbonate and boric acid are powdery soilds and, therefore, their amounts are given on a dry basis. The latter two components sodium bicarbonate and boric acid greatly contribute to the glassy-like appearance of articles polished with the compositions herein disclosed. However, if too much of either is used in the polish, one will note that the composition becomes somewhat gummy, thickened, or cloudy. Should this condition occur, the amount of soda or acid may be decreased to fall within the previously indicated ranges.

All the components herein are of commercial grade and easily accessible at most retail drug and hardware stores. In view of this, it should be understood that the representative amounts herein do contain a minor amount of inert ingredients.

The component tung oil (also known as China wood oil) is a drying agent having a specific gravity in the range 0.936–0.943, an iodine number between 163–171, and a saponification number between 190–197. The solvent for the polish components is simply industrial grade turpentine having a specific gravity in the range $d_{25}^{25}$ 0.894–0.930 and an index of refraction in the range $n_D^{20}$ 1.4680–1.4780.

The polish is formulated simply by combining the ingredients in the relative amounts as indicated, and then thoroughly mixing the resultant solution. Formulation is carried out at ambient temperature and pressure.

Application of the polish is equally as easy. A small amount may be placed on a dry or slightly damp cloth and gently spread on the surface to be protected. After a short period of drying time, the surface may be rubbed with a soft, dry cloth to a high gloss shine.

The invention is further illustrated by the following examples:

EXAMPLE 1

A system of 3 teaspoons isoamyl acetate, ¼ teaspoon calcium oxide, ⅛ teaspoon tung oil, ⅛ teaspoon sodium bicarbonate, ⅛ teaspoon boric acid, and the balance of turpentine to make one pint of polish was thoroughly mixed in a container. The resulting solution was useful as a cleaning and polishing agent.

EXAMPLE 2

A system of 3 teaspoons isoamyl acetate, ¼ teaspoon calcium oxide, ½ teaspoon tung oil, ⅛ teaspoon sodium bicarbonate, ⅛ teaspoon boric acid, and the balance of turpentine to make one pint of polish was thoroughly mixed in a container. The resulting solution was useful as a cleaning and polishing agent.

EXAMPLE 3

A system of 3 ½ teaspoons isoamyl acetate, ⅓ teaspoon calcium oxide, ¾ teaspoon tung oil, ½ teaspoon sodium bicarbonate, ⅓ teaspoon boric acid, and the balance of turpentine to make one pint of polish was thoroughly mixed in a container. The resulting solution was useful as a cleaning and polishing agent.

EXAMPLE 4

A system of 4 ½ teaspoons isoamyl acetate, ⅓ teaspoon calcium oxide, 1 ½ teaspoons tung oil, ½ teaspoon sodium bicarbonate, 1 teaspoon boric acid, and the balance of turpentine to make one pint of polish was thoroughly mixed in a container. The resulting solution was useful as a cleaning and polishing agent.

EXAMPLE 5

A system of 6 teaspoons isoamyl acetate, ½ teaspoon calcium oxide, 2 teaspoons tung oil, 1 teaspoon sodium bicarbonate, 2 teaspoons boric acid, and the balance of turpentine to make one pint of polish was thoroughly mixed in a container. The resulting solution was useful as a cleaning and polishing agent.

EXAMPLE 6

A system of 7 teaspoons isoamyl acetate, ½ teaspoon calcium oxide, 2 ½ teaspoons tung oil, 2 teaspoons sodium bicarbonate, 5 teaspoons boric acid, and the balance of turpentine to make one pint of polish was thoroughly mixed in a container. The resulting solution was useful as a cleaning and polishing agent.

From the foregoing it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth is to be interpreted as illustrative and not in a limiting sense.

Having thus described my invention, I claim:

1. A liquid polish comprising, by volume, 1 to 16% isoamyl acetate, ¼ to 4% calcium oxide, ¼ to 6% tung oil, ¼ to 8% sodium bicarbonate, ¼ to 8% boric acid, and the balance of turpentine.

2. The polish as in claim 1 wherein, by volume, isoamyl acetate is 3 to 8%; calcium oxide is ¼ to 1%; tung oil is ¼ to 2%; sodium bicarbonate is ¼ to 4%; boric acid is ¼ to 4%; and turpentine is the balance.

* * * * *